US007107584B2

(12) United States Patent
Bond et al.

(10) Patent No.: US 7,107,584 B2
(45) Date of Patent: Sep. 12, 2006

(54) DATA ALIGNMENT BETWEEN NATIVE AND NON-NATIVE SHARED DATA STRUCTURES

(75) Inventors: Barry Bond, Maple Valley, WA (US); ATM Shafiqul Khalid, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 791 days.

(21) Appl. No.: 10/001,126

(22) Filed: Oct. 23, 2001

(65) Prior Publication Data

US 2003/0097247 A1 May 22, 2003

(51) Int. Cl.
*G06F 9/45* (2006.01)
(52) U.S. Cl. .................. 717/151; 712/204; 712/208; 719/328; 719/330
(58) Field of Classification Search ........ 717/136–138, 717/151; 712/204, 208; 719/328–330
See application file for complete search history.

(56) References Cited

U.S. PATENT DOCUMENTS

| 4,742,447 | A |   | 5/1988  | Duvall et al. ............... 718/1   |
|-----------|---|---|---------|--------------------------------------|
| 4,992,931 | A |   | 2/1991  | Hirasawa ................... 710/66   |
| 5,036,484 | A |   | 7/1991  | McCoy et al. .............. 703/23    |
| 5,132,898 | A |   | 7/1992  | Sakamura et al. .......... 712/210    |
| 5,499,380 | A |   | 3/1996  | Iwata et al. ................ 711/212 |
| 5,560,013 | A |   | 9/1996  | Scalzi et al. ............... 717/138 |
| 5,617,554 | A |   | 4/1997  | Alpert et al.                        |
| 5,619,666 | A | * | 4/1997  | Coon et al. ................ 712/208  |
| 5,761,477 | A |   | 6/1998  | Wahbe et al. ............... 718/1    |
| 5,860,072 | A | * | 1/1999  | Schofield .................. 707/101  |
| 5,961,582 | A |   | 10/1999 | Gaines ...................... 718/1   |
| 6,009,510 | A | * | 12/1999 | Henry et al. ............... 712/204  |
| 6,026,238 | A |   | 2/2000  | Bond et al. ................ 717/141  |
| 6,061,779 | A | * | 5/2000  | Garde ....................... 712/204 |
| 6,070,010 | A | * | 5/2000  | Keenleyside et al. ....... 717/154    |
| 6,091,897 | A |   | 7/2000  | Yates et al. ............... 717/138  |
| 6,199,202 | B1|   | 3/2001  | Coutant et al. ............ 717/138   |

(Continued)

FOREIGN PATENT DOCUMENTS

EP 0 372 835 A2 6/1990

(Continued)

OTHER PUBLICATIONS

Stephen T. Walker, "The advent of trusted·X· computer operating systems," AFIPS Conference Proceedings, 1980 National Computer Conference, May 19-22, 1980, Anaheim, CA USA, pp. 655-665.

(Continued)

*Primary Examiner*—Kakali Chaki
*Assistant Examiner*—Lawrence Shrader
(74) *Attorney, Agent, or Firm*—Lee & Hayes, PLLC

(57) ABSTRACT

Described herein is a technology facilitating the operation of non-native program modules within a native computing platform. This technology provides a mechanism for aligning—as necessary—parameters of data structures so that program modules or operating systems of different paradigms may use them. The data of parameters of data structures is aligned to match the native paradigm. Typically, such data structures are shared by non-native program modules and the native operating system (or other program modules). It is aligned so that data—that would otherwise be non-aligned and performance hindering—is quickly and easily accessible by the native platform. This abstract itself is not intended to limit the scope of this patent. The scope of the present invention is pointed out in the appending claims.

20 Claims, 6 Drawing Sheets

U.S. PATENT DOCUMENTS

| | | | |
|---|---|---|---|
| 6,269,409 B1 | 7/2001 | Solomon | 719/239 |
| 6,513,057 B1 * | 1/2003 | McCrory | 718/102 |
| 6,882,968 B1 | 4/2005 | Linden | |
| 6,901,583 B1 | 5/2005 | Park | |

FOREIGN PATENT DOCUMENTS

| | | |
|---|---|---|
| EP | 0 571 683 A1 | 12/1993 |
| EP | 1 209 564 A2 | 5/2002 |
| WO | WO 99/31584 | 6/1999 |

OTHER PUBLICATIONS

Philip Dyer, "The Game Room," Macworld, vol. 16, No. 1, Jan. 1999, p. 190.

R.Rashid, R. Baron, A. Forin, D. Golub, M. Jones, D. Julin, D. Orr, R. Sanzi, "Mach: A Foundation for Open Systems," Workstation Operating Systems: Proceedings of the Second Workshop on Workstation Operating Systems, Sep. 27-29, 1989, Pacific Grove, CA USA, pp. 109-113.

Michael Franz, "Emulating an Operating System on Top of Another," Software—Practice and Experience, vol. 23(6), (Jun. 1993), pp. 677-692.

* cited by examiner (background)

32-bit Memory Addressing Scheme 64-bit Memory Addressing Scheme 64-bit Memory Addressing Scheme

DATA ALIGNMENT BETWEEN NATIVE AND NON-NATIVE SHARED DATA STRUCTURES

TECHNICAL FIELD

This invention generally relates to a technology facilitating the operation of non-native program components within a native computing platform.

BACKGROUND

Applications designed to run on a specific computing platform do not operate on different computing platforms. Generally, software is inextricably linked to the specific computing platform for which it is designed to operate. For example, software written and compiled to operate within minicomputer running a specific implementation of the Unix operating system will not function within a hand-held computer using a proprietary operating system.

A computing platform typically includes an operating system (OS) and computing hardware architecture. Examples of OSs include these Microsoft® operating systems: MS-DOS®, Windows® XP, Windows® 2000, Windows NT® 4.0, Windows® ME, Windows® 98, and Windows® 95. Examples of computing hardware architecture include those associated with these Intel® microprocessors: 80286, Pentium®, Pentium® II, Pentium® III, and Itanium™.

Examples of computing platforms includes 16-bit platforms (such as Microsoft® MS-DOS® and Intel® 80286), 32-bit platforms (such as Microsoft® Windows® NT® and Intel® Pentium® II), and 64-bit platforms (such as Intel® Itanium™ and, for example, Windows® XP 64-bit Edition). A computing platform may also be called a platform, computing environment, or environment.

Specific versions of applications are designed to operate under a specific platform. These applications may be called "native" when they execute under their specific platform. For example, Microsoft® Office 2000 is an application designed to operate on a 32-bit platform. In other words, Microsoft® Office® 2000 is a native application relative to its 32-bit platform. However, these 32-bit applications may be called "non-native" when they execute under a different platform, such as a 64-bit platform.

An example of a program-module target platform (or simply "target platform") is the platform that an executable program (e.g., program module, application, program) was targeted to run. For a program module, its target platform is also its native platform. For example, if one builds a Microsoft® Office® application to run under Windows® 2000 32-bit X86 OS environment then for that image target platform would be 32-bit x86.

An application program is the primary example of a "program module" as the term is used herein. However, the term "program module" includes other executable software that may not be labeled an application.

Typical Computer Architecture

Typical computer architecture is multi-layered. From the bottom up, it includes the hardware layer, the operating system (OS) layer, and the application layer. Alternatively, these layers may be described as the hardware layer, the kernel mode layer, and the user mode layer.

FIG. 1 illustrates the layers of typical computer architecture 100. The top of the architecture is the user mode 110. It includes applications, such as applications 112a–e. These applications communicate with a set of APIs 120. Typically, this API set is considered part of the OS, and thus, part of the computing platform.

The next layer of the architecture is the kernel mode 130. This may be generally called the "kernel" of the OS. Since it is part of the OS, it is part of the computing platform.

A kernel of an OS is the privileged part of the OS—the most trusted part of the OS. It is an inner layer of code. It typically operates I/O 132, security 134, display control (i.e., access to the screen) 136, memory management 138, and other privileged functions 139. The kernel has sole access to the hardware in the hardware layer 150 via device drivers 142 and other hardware interfaces 144.

Kernel APIs 140 are those APIs within the kernel that arbitrate access to the kernel functions. The applications typically do not call the kernel directly. Instead, the applications call the APIs 120 and the APIs, in turn, may call the kernel (in particular the kernel APIs 140).

Although FIG. 1 does not show the components 132–144 of the kernel 130 with connections between them, these components are connected as is necessary. The coupling lines are omitted from the drawing for the sake of simplicity and clarity.

Below the kernel mode 130, there is the hardware layer 150. This layer includes all of the hardware of the actual computer. This includes the processor(s), memory, disk I/O, other I/O, etc. The platform also includes the hardware layer.

Therefore, a computing platform includes the hardware layer, the kernel layer, and typically the user-mode APIs 120.

Interoperability and Compatibility

Application compatibility has long been a major concern since computing platforms began evolving. People want to run their desired applications in their chosen platform in the ideal world. However, in the real world, it is difficult to impossible to run an application on a different host platform for which it was not designed. For example, a 32-bit x86 application cannot run on 64-bit Itanium (IA64) environment. The problem worsens when people buy a more powerful machine with a different platform than they have used previously. Immediately, all the applications from the old platform become useless.

Each platform has its corresponding body of native applications that are a designed to run under it. When a new generation of platform is released, software developers generally upgrade their products to run under the new generation platform. Software developers do this for many reasons, including marketing, technology, and economics.

For similar reasons, OS developers like their products to be backwards compatible. In this way, older generations of applications may run on the latest generation of the OS (and thus the latest generation of platform). In other words, if non-native applications can run under a native platform (including the new OS), users are encouraged to purchase the new OS because they are not forced to discard their current applications and purchase new versions. This also gives software developers time to develop upgrades to their applications.

Herein, an example of compatibility is a non-native program module functioning appropriately and peacefully co-existing with native program modules within a native computing environment (e.g., an OS).

As used herein, an example of interoperability is the ability of both native and non-native program modules to share resources (such as access data within each other's memory space or a shared memory space) and/or work together and cooperatively.

For the sake of clarity and simplicity, an example is used herein to illustrate the problem of incompatibility of non-native applications and non-interoperability between native and non-native applications. In this example, the non-native program modules are called 32-bit applications because they are designed to operate on a 32-bit platform. In this example, the native applications are called 64-bit applications because they are designed to operate on the native platform, which is 64-bit. This is provided as one example and not for limitation. Those of ordinary skill in the art understand and appreciate that there exists other combinations of native and non-native applications and native platforms.

Running Non-Native Applications on a Native Platform

Consider this: Running non-native applications on a native platform. More specifically, consider this example: Running 32-bit applications in a 64-bit environment. Assume, for this example, that the 64-bit platform is an upgrade to an existing popular 32-bit platform (on which the 32-bit applications are designed to run).

In computer architecture, the numbered-bit platform (e.g., 32-bit platform) typically refers to the word size of addressable memory of a platform. Typically, a word is a unit of data that is moved in a single operation from storage to a processor register. In the most familiar architectures of the past few decades, a word has been four bytes in length, or 32 bits. Both IBM's mainframe processors and Intel's processors, used in standard PCs, have used a 32-bit word. Recent processor architectures from Intel and others provide for a 64-bit word.

One advantage of a 64-bit platform over a 32-bit platform is that the much larger memory space can be addressed. Primarily, this is because an address to memory may be 64-bits long in the 64-bit platform as opposed to the typical 32-bit long address of the 32-bit platform.

Alignment of Data

Alignment is putting data into the computer memory at addresses that are more efficient for the platform to access. Typically, this is done by storing data at word boundaries of memory. This may be done at the price of wasting some memory when the data being stored is less than a word in size. However, the benefit of alignment is speed. Alignment of data stored in memory speeds memory access of such data because the computer platform is utilized most efficiently.

For example, a modern RISC platform reads from memory in multi-byte chunks, usually 4 or 8 bytes long, these chunks must begin at addresses that are multiples of the chunk size. Memory accesses to misaligned addresses are emulated by multiple aligned accesses and is much slower, or may generate bus errors and abort the program. Other platforms can handle misaligned (i.e., byte aligned) memory accesses more gracefully, but it degrades performance.

Those of ordinary skill in the art of familiar with the alignment of data and the costs and benefits of doing so.

Memory Shared by Native and Non-Native

One problem with interoperability and compatibility is managing memory shared between non-native (e.g., 32-bit) applications and native (e.g., 64-bit) applications. Another is managing memory shared between non-native (e.g., 32-bit) applications and the native (e.g., 64-bit) operating system.

This is particularly true when the memory address alignment differs between native and non-native. For example, all data is aligned in memory on four (4) byte increments in a 32-bit environment and all data is aligned on eight (8) byte increments. In such a situation, it is possible for data of a non-native application to be stored in a manner that is not aligned for the purposes of the native environment.

FIG. 2 illustrates this point. Memory blocks 210 represent a memory structure based upon a 32-bit word addressing scheme. The bold vertical lines indicate the word boundaries. 64-bits of data, labeled "A1" through "A8", is stored in two word-sized memory locations 212 and 214. 32-bits of data, labeled "B1" through "A4", is stored in a single word-sized memory location 216.

In FIG. 2, memory blocks 230 and 250 represent a memory structure based upon a 64-bit word addressing scheme. Again, the bold vertical lines indicate the word boundaries.

When the A1–A8 data and B1–B4 data of blocks 210 is converted for use by a 64-bit memory addressing scheme, it may stored and addressed in the manner depicted in by memory blocks 230. More specifically, this manner is unaligned. However, the same data is stored in an aligned fashion in memory blocks 250.

Thus, when faced with the decision on whether to align data, one option to ignore the issue and allow the hardware to compensate for it. As described above and illustrated by memory blocks 230 of FIG. 2, the hardware may compensate by accessing overlapping data from more than one contiguous memory address locations. The cost of this approach is the extra time required to access data from memory. This approach is feasible only if the lost time (of multiple accesses) is tolerable.

What if the time wasted by compensating for data non-alignment within memory becomes intolerable?

Another issue is whether it is always necessary to force an alignment. Sometimes alignments happen naturally.

SUMMARY

Described herein is a technology facilitating the operation of non-native program components within a native computing platform.

This technology provides a mechanism for aligning—as necessary—parameters of data structures so that program modules or operating systems of different paradigms may use them. The data of parameters of data structures is aligned to match the native paradigm. Typically, such data structures are shared by non-native program modules and the native operating system (or other program modules). It is aligned so that data—that would otherwise be non-aligned and performance hindering—is quickly and easily accessible by the native platform.

This summary itself is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference, like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of the present invention, thereby better explaining the present invention. Furthermore, for ease of understanding, certain method steps are delineated as separate steps; however, these separately delineated steps should not be construed as necessarily order dependent in their performance.

The following description sets forth one or more exemplary implementations of a Data Alignment between Native and Non-Native Shared Data Structures. The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a Data Alignment between Native and Non-Native Shared Data Structures may be referred to as an "exemplary data aligner."

Incorporation by Reference

This following U.S. patent application is incorporated by reference herein: U.S. patent application Ser. No. 09/847,535, titled "Kernel Emulator for Non-Native Program Modules" filed on May 1, 2001.

Introduction

Figure 6:
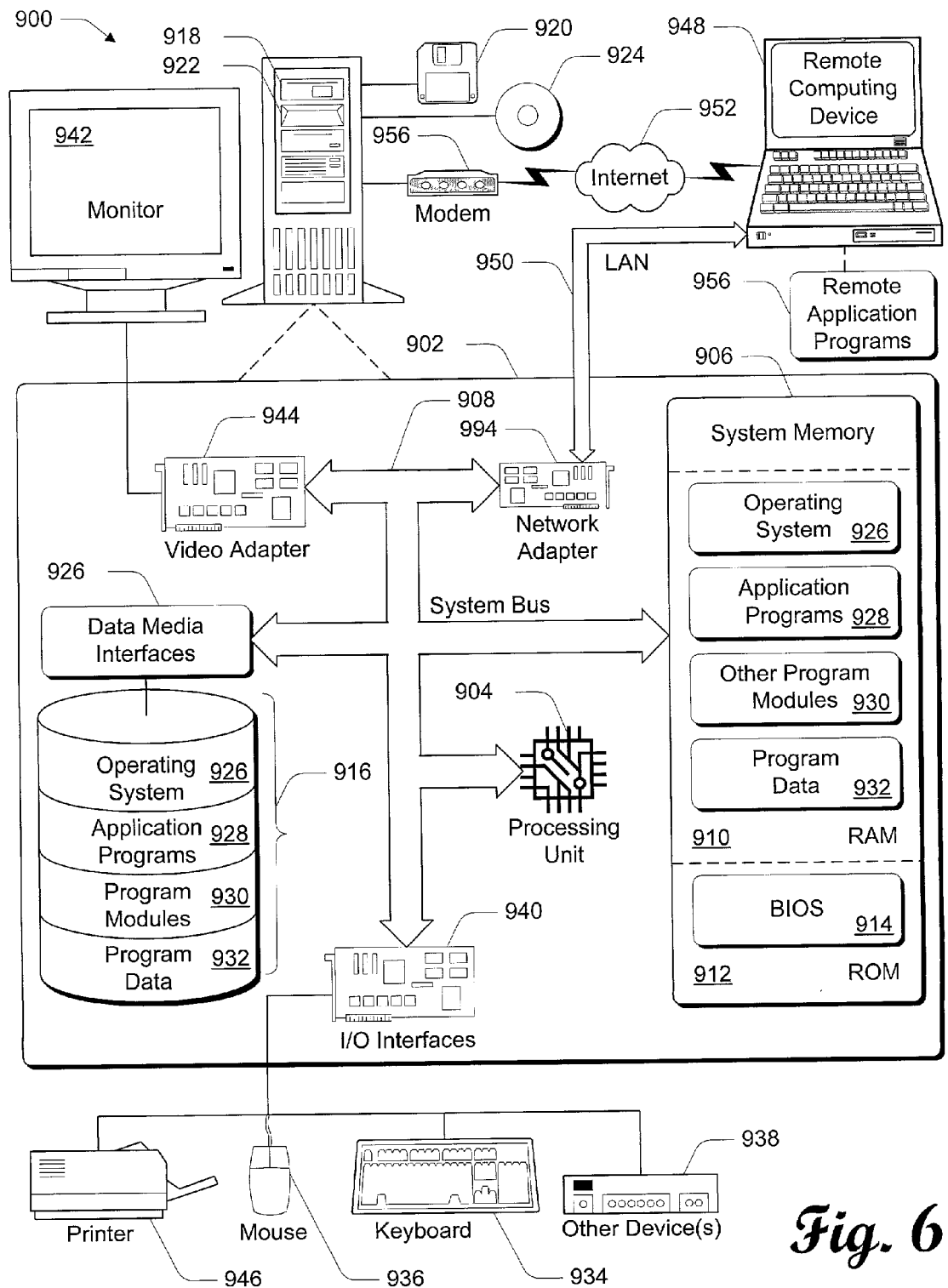
FIG. 6 is an example of a computing operating environment capable of implementing an embodiment (wholly or partially) described herein.

The one or more exemplary implementations, described herein, of the exemplary data aligner may be implemented (in whole or in part) by a native/non-native format conversion system 400 and/or by a computing environment like that shown in FIG. 6.

The exemplary data aligner, described herein, provides a mechanism with which non-native applications can be run on a native platform transparently and effectively. For instance, 32-bit applications can be run on 64-bit platform by using the exemplary kernel emulator. More specifically, exemplary data aligner, described herein, provides a mechanism for aligning—as necessary—data structures shared by applications and/or operating system of differing platforms (e.g., native and non-native).

Overview of Kernel Emulation

The exemplary data aligner, described herein, may be implemented (for example) as part of a kernel emulation, such as that described U.S. patent application Ser. No. 09/847,535, titled "Kernel Emulator for Non-Native Program Modules" filed on May 1, 2001 (which is incorporated herein by reference).

Within such kernel emulation, the non-native applications behave as though they are running on an operating system (OS) with their non-native kernel. Their non-native kernel is being emulated. The non-native kernel emulator intercepts kernel calls made by the non-native applications and translates them into native kernel calls.

An Example of a Suitable Computer Architecture

Figure 3:
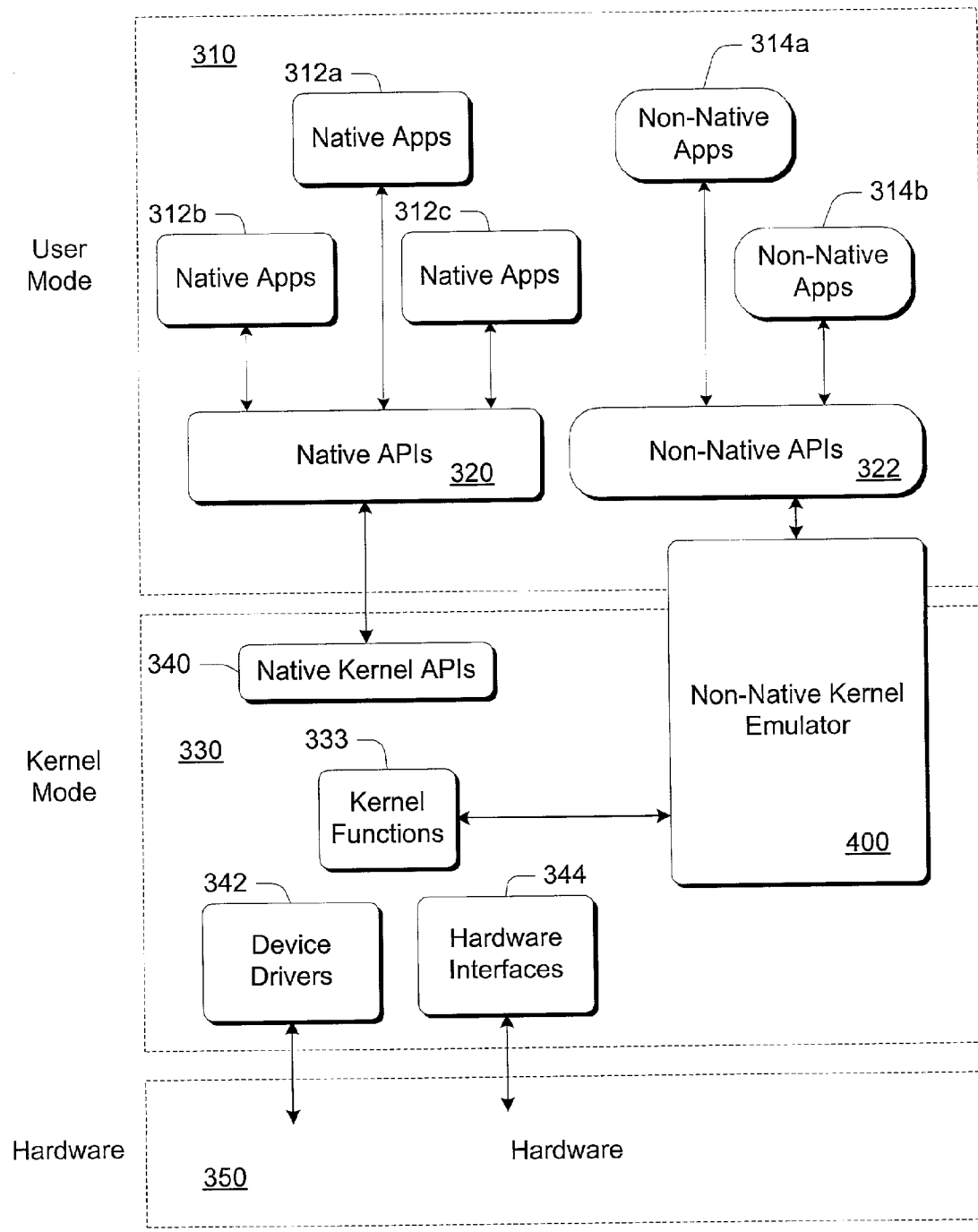
FIG. 3 is a schematic block diagram showing a computing architecture suitable for an embodiment described herein.

FIG. 3 illustrates an example of a computer architecture 300, which is suitable to implement the exemplary data aligner. Those of ordinary skill in the art understand and appreciate other possible computer architectures that may be suitable to an implementation.

The architecture includes a native platform, which includes hardware 350, kernel mode 330, and set of native APIs 320 of user mode 310. The top of the architecture 300 is the user mode 310. It includes applications. More specifically, it includes native applications (such as applications 312*a*–*c*) and non-native applications (such as applications 314*a* and 314*b*).

The native applications communicate with a set of native APIs 320. Typically, this native API set 320 is considered part of the native OS, and thus, part of the native computing platform. The non-native applications communicate with a set of non-native APIs 322. Typically, this non-native API set 320 is considered part of a non-native OS, and thus, the set is not part of the native computing platform.

The next layer of the architecture 300 is the native kernel mode 330. This may be generally called the native "kernel" of the native OS. Since it is part of the native OS, it is part of the native computing platform.

This native kernel 330 includes the native kernel APIs 340 and various kernel functions 333, such as I/O, security, display control (i.e., access to the screen), memory management, and other privileged functions. The native kernel 330 has sole access to the hardware in the hardware layer 350 via device drivers 342 and other hardware interfaces 344. Native kernels APIs 340 are those APIs within the kernel that arbitrate access to the kernel functions.

Below the kernel mode 330, there is the hardware layer 350. This layer includes all of the hardware of the actual computer. This includes the processor(s), memory, disk I/O, other I/O, etc. The native platform also includes the hardware layer.

Therefore, native computing platform includes the hardware layer 350, the kernel layer 330, and typically the user-mode native APIs 320. The native platform does not include the non-native APIs 322 or the non-native kernel emulator 400.

An Example of a Kernel Emulator

Figure 4:
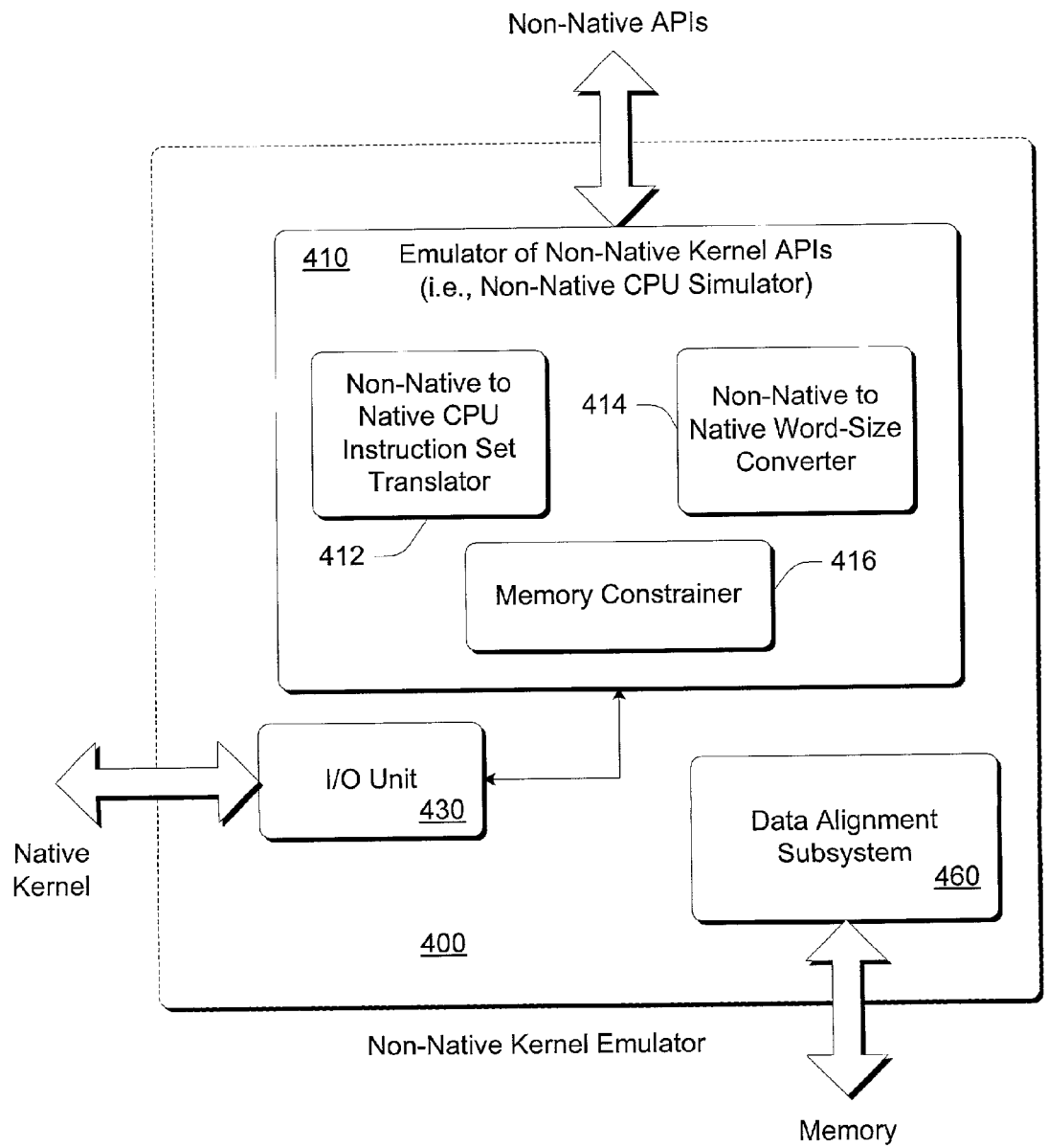
FIG. 4 is a schematic block diagram of a kernel emulator suitable for an embodiment described herein.

FIG. 4 illustrates the non-native kernel emulator 400, which is an implementation of an exemplary kernel emulator that may employ an embodiment of the exemplary data aligner. It includes an emulator 410 of non-native kernel APIS, which may also be called the non-native CPU simulator (or simply the "CPU simulator). To avoid confusion with nomenclature, this will be called CPU simulator 410.

The CPU simulator 410 includes a translator 412 for translating non-native to native CPU instructions sets, a converter 414 for converting non-native to native word sizes, and a memory constrainer 416 to limit the memory accessible to non-native applications to that which such applications are capable of addressing.

Calls to the Kernel by Non-Native Applications

The CPU simulator 410 receives the kernel calls from non-native applications. More specifically, the CPU simulator 410 receives the kernel calls from non-native APIs.

The kernel emulator 400 does not perform the functions of a kernel. Rather, it translates the non-native calls from their non-native format to a native format. It then passes the translated calls onto the native kernel for the native kernel to process as if the call was from a native application. However, to do this may involve more than a simply translation of a language. It may involve a conversion of paradigms between the non-native and native platforms.

The translator 412 performs instruction emulation. It handles the emulation of the non-native processor's instruction set.

The converter 414 manages both argument format and word size. It changes the argument format from non-native to native and changes the word size from non-native to native.

Together, the translator 412 and converter 414 manage the argument-passing-via-stack convention of the 32-bit platform to the argument-passing-via-registers convention of the 64-bit platform. This is an example of a paradigm change in how argument values are passed. The CPU simulator 410 accounts for this change with its translation of the CPU instruction set by translator 412.

In another example, in a 32-bit platform, the word size is 32 bits long. Thus, addresses and data are typically written in 32-bit sized words in memory. In a 64-bit platform, the word size is 64 bits long. Thus, addresses and data are typically written in 64-bit sized words in memory.

Parameters (i.e., arguments) are typically one word long. Therefore, the parameters for the 64-bit kernel APIs are 64-bits long; rather than 32-bits long for the 32-bit kernel APIs.

The converter stretches the 32-bit arguments passed by the non-native applications (and APIs) from 32-bits to 64-bits. One example of how it does this is by padding the argument with 32 leading zeroes. In the exemplary implementation, the converter 414 operates primarily within the user layer.

As discussed above, differing platforms typically have differing word sizes. Consequently, the size of the addressable memory space differs, as well. Therefore, the converter 414 converts the addresses (in particular, pointers) as part of its word conversion.

For instance, the memory addresses of a 32-bit platform may be up to 32-bits long; thus, the maximum addressable memory is approximately 4GB (if one of the bits is reserved, then the maximum is about 2GB). The memory addresses of a 64-bit platform may be up to 64-bits long; thus, the maximum addressable memory is measured in terabytes. Thus, the size of addressable memory differs between the 32-bit and 64-bit platforms.

Data Structures Shared Between Native and Non-Native

One problem with interoperability and compatibility is managing memory shared between non-native (e.g., 32-bit) applications and native (e.g., 64-bit) applications or the native (e.g., 64-bit) operating system. In particular, it is problematic when data structures (stored in such memory) are shared between non-native applications and native applications or the native operating system.

Alignment

Alignment of data is one way that shared data structures may be problematic. When data of a shared data structure is converted from a non-native to native format, it is desirable to redefine word boundaries rather than copy and move the data within the memory. Such copying and moving of data consumes valuable time and resources.

Sometimes word size differences between native and non-native are multiples of other. For example, a 64-bit word platform is a multiple of a 32-bit word platform. Consequently, when the word boundaries are re-defined, such boundaries may spontaneously fall between data that is already such a multiple (e.g., 64-bit long data).

Looking at memory blocks 210 and 250 and the data contained therein, the reader can see an instance of what may be considered an example of such spontaneous word boundary re-definition. In other words, if the word boundaries of blocks 210 (which includes data structure 212 and 214 and data A1–A8) is remapped, they may appear as data structure 252 of memory blocks 250. That data structure 252 includes aligned data 262. In this instance, the memory boundaries spontaneously fell such that the data aligns.

Non-Alignment

Conversely, when the word boundaries are re-defined, such boundaries may spontaneously fall within data—thus, leaving the data unaligned. Looking at memory blocks 210 and 230 and the data contained therein, the reader can see an instance of what may be considered an example of such spontaneous word boundary re-definition where the data is unaligned. In other words, if the word boundaries of blocks 210 (which includes data structure 212 and 214 and data A1–A8) is remapped, they may appear across blocks 232 and 234 of memory blocks 230. Those blocks 232 and 234 includes unaligned data 242. In this instance, the memory boundaries spontaneously fell such that the data is unaligned.

Alignment Motivation

Thus, when faced with the decision on whether to align data, one option to ignore the issue and allow the hardware to compensate for it. In some instances, the hardware may compensate by accessing overlapping data from more than one contiguous memory address locations. The cost of this approach is the extra time required to access data from memory. This approach is feasible only if the lost time (of multiple accesses) is tolerable.

An example of tolerable non-alignment cost is that of Intel® x86 processors. While the cost of accessing aligned data was one unit of time (such as a cycle), the cost of accessing non-aligned data was approximately three units of time. Consequently, programmers of software designed for the Intel® x86 platform were not motivated to account for non-alignment of data because the performance hit was generally tolerable.

However, platforms exist that are highly optimized for accessing aligned data. So much so, that the process may stall significantly when attempting to access non-aligned data. The OS may appear to crash. In such instances, the cost of non-alignment is intolerable.

An example of intolerable non-alignment cost is that of Intel® IA64 processors. While the cost of accessing aligned data is one unit of time (such as a cycle), the cost of accessing non-aligned data is approximately ten thousand (10,000) or more. Consequently, if programmers of software designed for the Intel® IA64 platform fail to account for non-alignment of data, it may produce a wholly intolerable performance hit.

In at least one aspect, the exemplary data aligner forces an alignment of data stored in memory shared by both native and non-native applications and/or operating systems.

Data Alignment Subsystem

As shown in FIG. 4, the non-native kernel emulator 400 includes a data alignment subsystem 460 coordinate data alignment between native and non-native applications (or between non-native applications and native operating system). In the exemplary implementation, the data alignment subsystem 460 may be an embodiment of the exemplary data aligner.

As discussed above, the converter 414 resizes data structures as necessary to convert from non-native to native format (and vise versa). For example, block 216 of blocks 210 include data B1–B4. The converter may enlarge that to block 254 of blocks 250 to include data 264.

Figure 1:
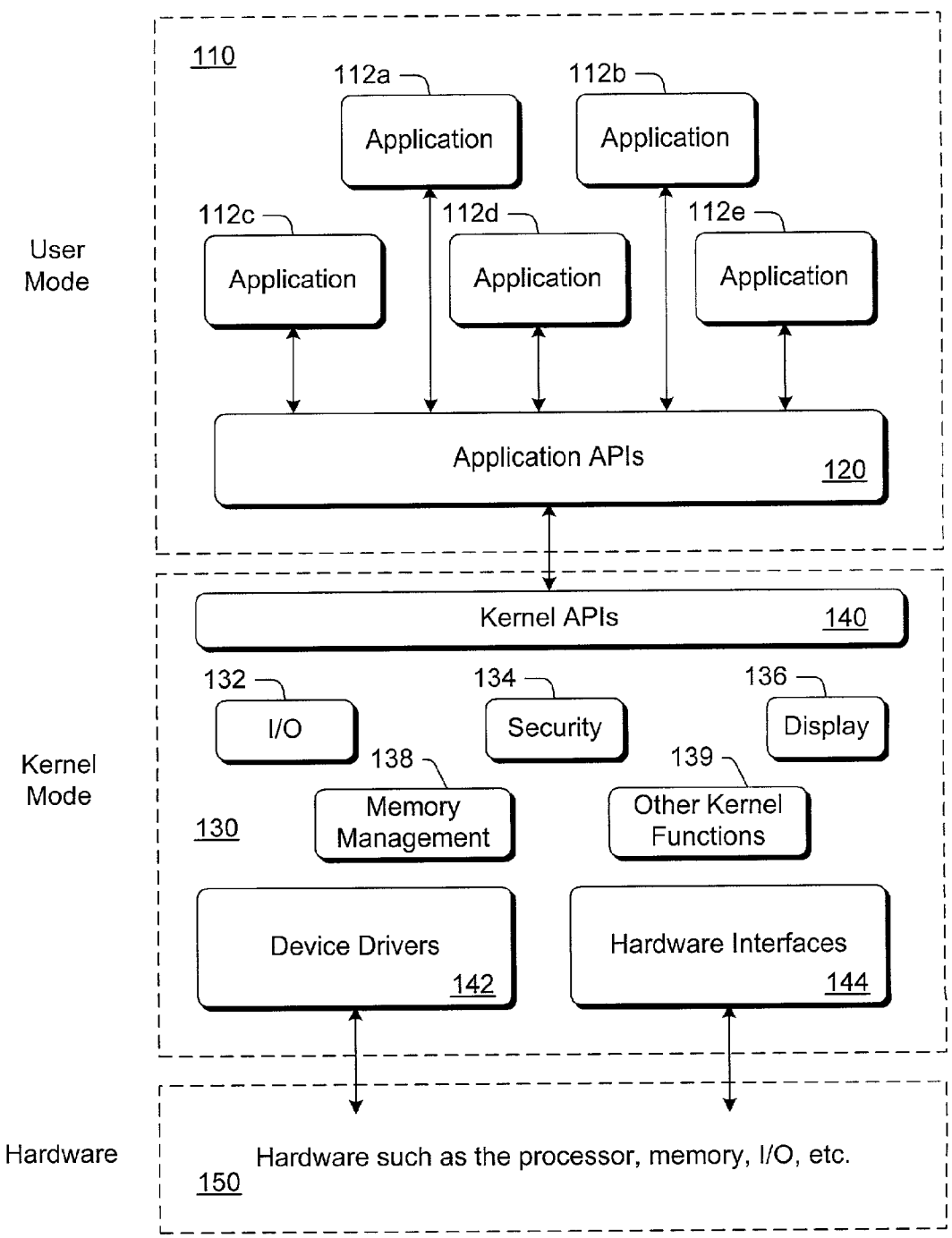
FIG. 1 is a schematic block diagram showing a computing architecture.
Figure 2:
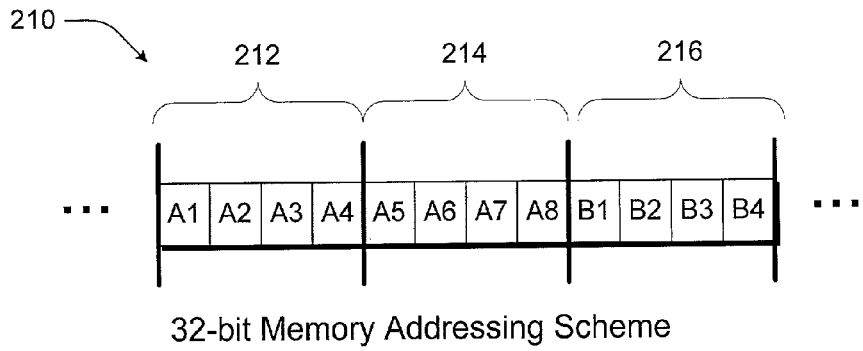
FIG. 2 a diagram illustrating native and non-native memory blocks.
Figure 2:
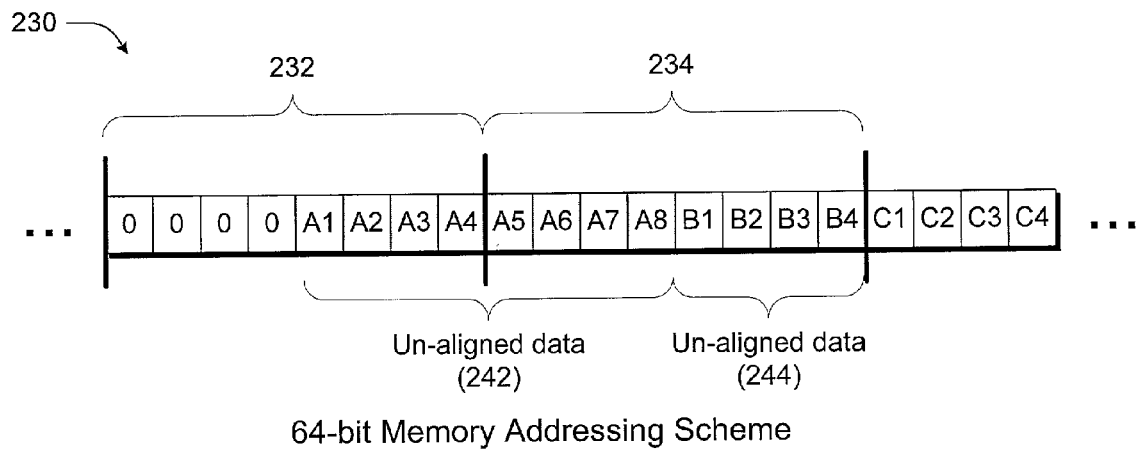
Figure 2:
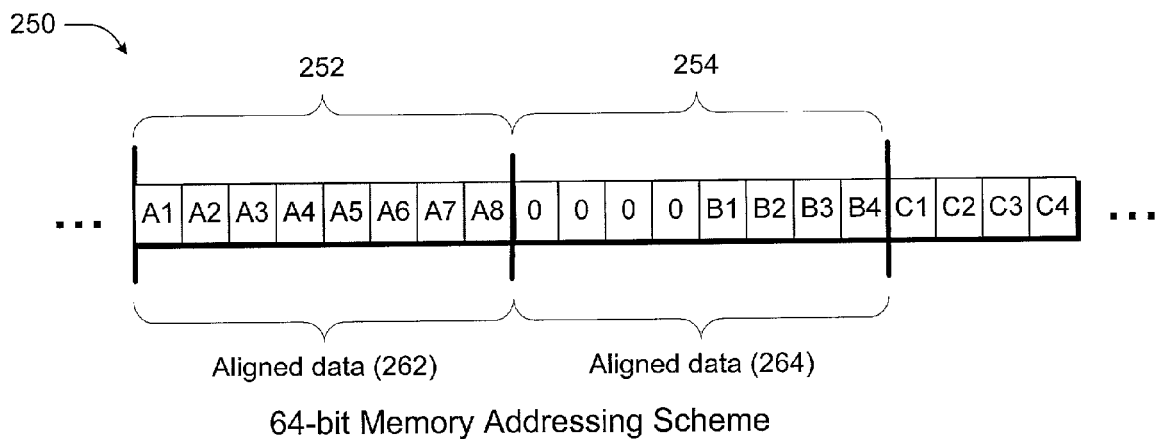

Although the converter 414 may successfully re-size data, such data may not be aligned. Some data structures (e.g., LARGE_INTEGER) may be correctly sized (e.g., 64-bit) for the native environment, but may not be aligned correctly for the native environment. An example of such is shown in memory blocks 210 and 230 of FIG. 2. One option to force alignment is copying data structure to a new location and align it. Since copying takes significantly more time than not copying and since the data structures may be correctly aligned, it is desirable if there was a way to determine if the data structure was aligned before copying.

The data alignment subsystem 460 examines a specific pre-identified type of data structure to determine whether it is aligned.

If it is not aligned, the data alignment subsystem 460 copies the data structure to an aligned memory block and the native environment is pointed to the copy. After a function is called that may work on that shared data structure, the data in the block is copied back to the original non-aligned space.

If, however, data structure is aligned, then the native environment is pointed to the original.

With the data alignment subsystem 460, the type of data structure is correctly sized (for the native environment) but it has been determined that it has a potential for being non-aligned. An example of such a data structure is LARGE_INTEGER.

Methodological Implementation of the Exemplary Data Aligner

FIG. 5A shows methodological implementation of the exemplary data aligner performed by the kernel emulator 400 (or some portion thereof). This methodological implementation may be performed in software, hardware, or a combination thereof.

Figure 5:
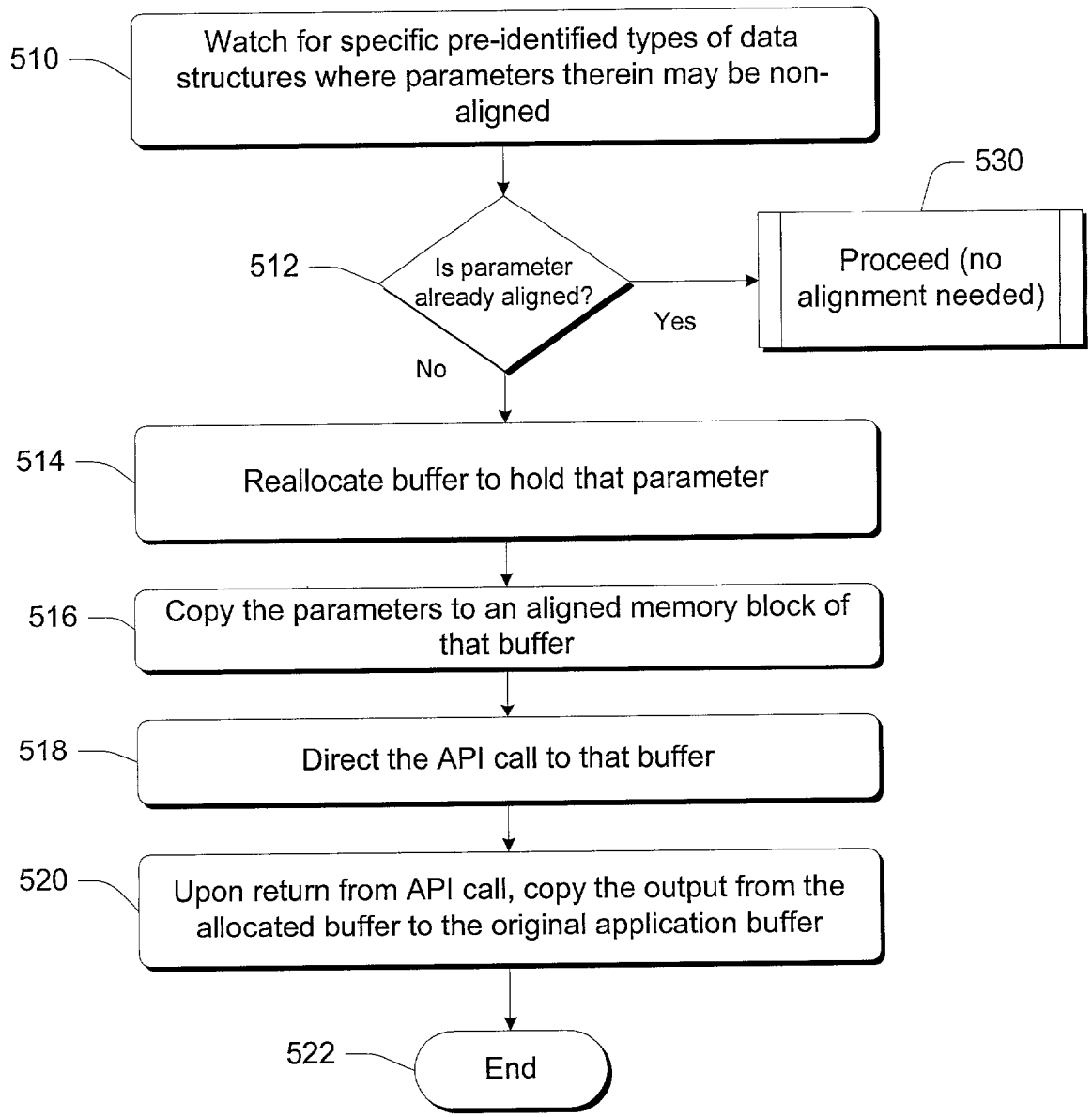
FIG. 5 is a flow diagram showing a methodological implementation described herein.

At 510 of FIG. 5, the data alignment subsystem 460 watches for specific pre-identified types of data structures which include parameters therein that may be non-aligned. At 512, the subsystem examines the parameters to determine whether such parameters are aligned. If so, then the process precedes to block 530 and no alignment is performed. If it is not aligned, then the process precedes to block 514.

At 514 of FIG. 5, the data alignment subsystem 460 reallocates a buffer to hold that parameter. At 516, the subsystem copies the parameters (and perhaps the entire data structure) to an aligned memory block. At 518, the native environment is pointed to the copy in the allocated buffer. After a function is called that may employ the shared data structure (and, thus, the parameters), the data in the block is copied back to the original non-aligned space (at 520). The process ends at 522.

If, however, parameters of the data structure are aligned, then the native environment is pointed to the original (as indicated in block 530).

Additional Details

In general, the kernel emulator (or equivalent) is an intermediate layer that co-ordinates the execution process while non-native applications (e.g., 32-bit apps) need to talk to the native OS for some support like accessing file information on disk, security info, event notification, etc. That intermediate layer is capable to watch any information passed back and forth between non-native applications (e.g., 32-bit apps) and native OS (e.g., 64-bit OS).

Handling Call Back Hook Issues:

Sometimes, non-native application might install an OS-to-application callback (often called a 'hook") that might affect the stability of the whole system. The hook might be some instructions in a non-native program module. Those non-native instructions might have some different information structure not applicable for native code (e.g., function pointer). While they are invoked from native execution path, native module is unaware that it is making a callback to a non-native hook.

To resolve the issue of data alignment within non-native hook calls, the hook is marked with an attribute to identify that the hook is set for a particular type of non-native application. The attribute will be used later to determine which execution path can execute the hook (i.e., the hook chain will be filtered based on the set attribute). That way incompatible execution path cannot go through certain hooks.

Sometimes emulated instructions might call native code in the kernel. While making those calls, emulated instructions also fill some call-back structure containing information where to return. Those structures are shared between native and emulated environment and might access non-aligned data. In the thunk layer, the data alignment subsystem 460 may repatch the structure before making any kernel call.

Shared Data structure:

There might be some information that is shared between the native OS and running emulated application. Native OS might require such information in a certain format. For example, that shared information might contain some function pointer that must be 8-byte aligned before OS can act on that. However, running application does not care because 4-byte alignment is sufficient for non-native applications (e.g., 32-bit apps). In that scenario, the data alignment subsystem 460 will identify such structure and automatically generate a thunk for those shared information when APIs pass those information back and forth.

Alignment Issue:

Examples of a data-type that needs alignment are data-types like LARGE_INTEGER, union having 64-bit integer as a member, and shareable 64-bit pointer that user-mode and OS share. If such data are not properly aligned, the OS might not accept that due to the performance penalty. It might choose not to continue to run. Alternatively, in the worse case, the OS might crash.

Inside the kernel emulator, the data alignment subsystem 460 watches for any parameters that might be of those data type or those might be a member in a structure. If the data alignment subsystem 460 finds such type, it checks the alignment. If it is not aligned, then the data alignment subsystem 460 reallocates buffer (i.e., the allocated buffer) to hold that parameter and make OS API call using this buffer rather than passing the original buffer passed to make this call. When the OS API successfully returns, the data alignment subsystem 460 copies the output from the allocated buffer to the application buffer.

In the above scenario, parameter patching might not work where applications pass some parameter as a pointer to a buffer that OS can interpret as a pointer to structure. In that case, the kernel emulator specifically needs to know which API passes that type of data. In some instances, the OS might interpret tat buffer as a pointer to some structure depending on some other parameters passed in the API. The data alignment subsystem 460 may generate some intermediate instructions based on some rules that can be applicable for any APIs or specific APIs that need those alignment fix-up within the kernel emulator.

Rules for LARGE_INTEGER Individual Data

This is an LARGE_INTEGER example to illustrate how a data-type may be realigned. Instructions generated from this template sit in the native section, and this template will be applied across all the APIs that pass LARGE_INTEGER. The non-native code might pass 4-byte aligned LARGE_INTEGER. In the native section the data alignment subsystem 460 keeps a copy of that data-type and pass that data-type while making native call. On its way out the data alignment subsystem 460 copies back the result to the client space.

```
TemplateName=LARGE_INTEGER
Locals=
// @ArgName(@ArgType) is an LARGE_INTEGER
*(might be unaligned) @NL
LARGE_INTEGER @ArgVal_Copy; @NL
End=
PreCall=
//FIXUP_LARGE_INTEGER @NL
if ((SIZE_T)@ArgHostName & 0x07 ) {
        @ArgName = &@ArgVal_Copy;
        @ArgVal_Copy = *(UNALIGNED LARGE_INTEGER *)
        @ArgHostName;
} else @ArgName = @ArgHostName;
End=
PostCall=
        if (@ArgName != @ArgHostName)
            *(UNALIGNED LARGE_INTEGER *)@*ArgHostName =
@ArgVal_Copy;
End=
```

Rules for Some Other Types:

The unaligned copy of data can be optimized for some specific scenario. For example, non-native applications (e.g., 32-bit apps) might guarantee to have 4-byte aligned data for some large data like LARGE_INTEGER. While emulating that on native OS (e.g., 64-bit OS) that need 8-byte aligned location, rather than making whole unaligned copy that might take 8 instructions to execute the data alignment subsystem 460 can make that by two instruction like as follows and also used in the following template:

Rules for APIs:

In this example an API might have a pointer to different structure defined by the another parameter. And this extension allow to thunk those structure based on the other parameter that determine the type.

```
TemplateName=ApiNamePassingBadBuffer
Case=(ParamThatDetermineType, THE_REAL_TYPE1)
Case=(ParamThatDetermineType, THE_REAL_TYPE2)
.....
Case=(ParamThatDetermineType, THE_REAL_TYPEn)
Locals=
    BOOL bRealigned=FALSE;
    PVOID *pTempFileInfo;
End=
PreCall=
    if ( (SIZE_T)(FileInformation) & (0x07) ) {
        // allocate a buffer with correct alignment,
        to pass to the Win64 API
        pTempFileInfo = FileInformation;
            FileInformation = The kernel
            emulatorAllocateTemp(Length);
        RtlCopyMemory(FileInformation, pTempFileInfo, Length);
        bRealigned = TRUE;
    }
End=
Begin=
@GenDebugNonPtrDepCases(@ApiName,FileInformationClass)
End=
PostCall=
    if (NT_SUCCESS(RetVal) && bRealigned) {
        RtlCopyMemory((PVOID)pTempFileInfo, FileInformation,
```

```
    *(LONG *)((PBYTE)@ArgValCopy) = *(LONG *)((PBYTE)@ArgHostName); @NL
    *(LONG *)(4+(PBYTE)@ArgValCopy) = *(LONG *)(4+(PBYTE)@ArgHostName);
@NL
    MacroName=PointerIN
    NumArgs=0
    Begin=
    @IfPointerToPtrDep(
        @IfIsArray(
        // Note: @ArgName(@ArgType) is an array of pointers to pointer dependent
types. @NL
        #error Error: don't know how to thunk an array of pointers to ptr dep. @NL
        )
        @IfNotIsArray(
        // Note: @ArgName(@ArgType) is a pointer to a pointer dependent type.
@NL
        if (THE KERNEL EMULATOR_ISPTR(@ArgHostName)) {
@NL
            @Indent(
              @IfInt64DepUnion(
                //Special Case union having LARGE_INTEGER member      @NL
                @ArgName = (@ArgType)@ArgValCopy; @NL
                *(LONG *)((PBYTE)@ArgValCopy) = *(LONG
*)((PBYTE)@ArgHostName); @NL
                *(LONG *)(4+(PBYTE)@ArgValCopy) = *(LONG
*)(4+(PBYTE)@ArgHostName); @NL
              )
              @IfNotInt64DepUnion(
                @ArgName = (@ArgType)@ArgValCopy;             @NL
                *((@ArgType)@ArgValCopy) = (@ArgTypeInd)*(((@ArgHostTypeInd
*)@ArgHostName); @NL
              )
            )
        }                                @NL
        else {                           @NL
        @Indent(
          @ArgName = (@ArgType)@ArgHostName;          @NL
        )
        }                                @NL
        )
    )
```

```
        Length);
    }
End=
```

Rules for Member Copy:

While copying some structure, the data alignment subsystem 460 adds an unaligned tag so that compiler can generate the right code and during execution it does not cause any alignment faults.

```
    MacroName=StdH2NCopy
    NumArgs=0
    Begin=
        @ArgName = @IfNotIsBitfield(@UnalignedTag64)(@ArgType)(@ArgHostName);
@NL
        End=
```

Exemplary Computing System and Environment

FIG. 6 illustrates an example of a suitable computing environment 900 within which an exemplary data aligner, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary data aligner may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary data aligner may be described in the general context of computer-executable instructions, such as program modules, being executed by a computer. Generally, program modules include routines, programs, objects, components, data structures, etc. that perform particular tasks or implement particular abstract data types. The exemplary data aligner may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 6 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy is disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of an interceptor, a call-converter, an argument converter, a translator, a shared-memory manager, an instruction-translator, an address-translator, a data aligner, and a target-platform determiner.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary data aligner may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 6 illustrates an example of a suitable operating environment 900 in which an exemplary data aligner may be implemented. Specifically, the exemplary data aligner(s) described herein may be implemented (wholly or in part) by any program modules 928–930 and/or operating system 926 in FIG. 6 or a portion thereof.

The operating environment is only an example of a suitable operating environment and is not intended to suggest any limitation as to the scope or use of functionality of the exemplary data aligner(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary data aligner may be stored on or transmitted across some form of computer readable media. Computer readable is media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An emulator for non-native program modules, the emulator comprising:
   an interceptor configured to intercept calls from non-native program modules;
   a translator configured to translate a non-native paradigm of non-native program modules for passing parameters into a native paradigm of native environment for passing parameters; and
   a data-aligner configured to align format of parameters in accordance with the native paradigm of native environment if it is determined that the parameters are not aligned, and not align format of the parameters if it is determined that the parameters are aligned.

2. An emulator as recited in claim 1, wherein the parameters, which the data-aligner is configured to align, are part of a data structure shared by the native environment and non-native program modules.

3. An emulator as recited in claim 1, wherein the translator is further configured to translate addresses from non-native length into native length.

4. An emulator as recited in claim 1, wherein word size of the native paradigm of native environment differ from word size of non-native paradigm of non-native program modules.

5. An emulator as recited in claim 1, wherein the data-aligner is implemented as part of a kernel emulation.

6. An operating system on a computer-readable medium, comprising:
   a native kernel configured to receive calls from native program modules;
   an emulator as recited in claim 1 configured to receive calls from non-native program modules.

7. A data alignment system facilitating interoperability and compatibility of non-native program modules and native environment, the system comprising:
   a parameter examiner configured to examine parameters of data structures stored in original buffers, and determine whether such parameters are aligned for a native environment; and
   a parameter aligner configured to:
      allocate a buffer for holding data of otherwise non-aligned parameters;
      copy data of such parameters to the allocated buffer so that the data is aligned for a native environment, wherein the data alignment system points to original buffers, if it is determined that parameters are aligned for the native environment.

8. A system as recited in claim 7, wherein the parameters are part of a data structure shared by the native environment and non-native program modules.

9. A system as recited in claim 7, wherein the parameters of a data structure are those that may be non-aligned when converted from a non-native paradigm to a native paradigm.

10. A system as recited in claim 7, wherein the parameter aligner is further configured to:
    redirect calls to otherwise non-aligned parameters to the allocated buffer;
    replace data in an original buffer with data from the allocated buffer.

11. A system as recited claim 7, wherein the system is implemented as part of a kernel emulation.

12. A method facilitating interoperability and compatibility of non-native program modules and native environment, the method comprising:
    examining parameters of data structures;
    determining whether such parameters are aligned for a native environment;
    responsive to a determination that such parameters are not aligned:
       allocating a buffer for holding data of otherwise non-aligned parameters;
       copying data of such parameters to the allocated buffer so that the data is aligned for a native environment and;
    pointing to an original buffer holding the data, if it is determined that the parameters are aligned.

13. A method as recited in claim 12, responsive to a determination that such parameters are not aligned, further comprising:
    redirecting calls to otherwise non-aligned parameters to the allocated buffer;
    replacing data in the original buffer with data from the allocated buffer.

14. A method as recited in claim 12, wherein the parameters are part of a data structure shared by the native environment and non-native program modules.

15. A method as recited in claim 12, wherein the parameters of a data structure are those tat may be non-aligned when converted from a non-native paradigm to a native paradigm.

16. A computer comprising one or more computer-readable media having computer-executable instructions that, when executed by the computer, perform the method as recited in claim 12.

17. A computer-readable medium having computer-executable instructions that, when executed by a computer, performs the method as recited in claim 12.

18. An operating system embodied on a computer-readable medium having computer-executable instructions that, when executed by a computer, performs the method as recited in claim 12.

19. A computer-readable medium having computer-executable instructions that, when executed by a computer, performs a method facilitating interoperability and compatibility of non-native program modules and native environment, the method comprising:
    examining parameters of data structures;
    determining whether such parameters are aligned for a native environment;
    responsive to a determination that such parameters are not aligned:
       allocating a buffer far holding data of otherwise non-aligned parameters;

copying data of such parameters to the allocated buffer so that the data is aligned for a native environment and;

pointing to an original buffer holding the data, if it is determined that the parameters are aligned.

20. A computer-readable medium of claim 19, wherein the method further comprises:

redirecting calls to otherwise non-aligned parameters to the allocated buffer, replacing data in the original buffer with data from the allocated buffer.

\* \* \* \* \*